US006963456B2

(12) United States Patent
Koehler et al.

(10) Patent No.: US 6,963,456 B2
(45) Date of Patent: Nov. 8, 2005

(54) ARRANGEMENT OF OPTICAL ELEMENTS IN PROJECTION SYSTEMS

(75) Inventors: Juergen Koehler, Jena (DE); Rainer Schnell, Jena (DE); Guenther Benedix, Jena (DE); Eberhard Piehler, Lehesten (DE); Hans-Juergen Meissner, Jena (DE); Bjoern Hauer, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/821,396

(22) Filed: Apr. 9, 2004

(65) Prior Publication Data

US 2004/0261517 A1 Dec. 30, 2004

(30) Foreign Application Priority Data

Apr. 10, 2003 (DE) ................................ 103 16 721

(51) Int. Cl.[7] ................................................ G02B 7/02

(52) U.S. Cl. ...................... 359/823; 359/694; 396/529; 353/101

(58) Field of Search ................ 359/811, 819, 821–823, 359/829, 703, 701, 704; 353/100, 101; 362/268, 362/455

(56) References Cited

U.S. PATENT DOCUMENTS

| | | | | |
|---|---|---|---|---|
| 5,313,330 | A | 5/1994 | Betensky | |
| 5,644,435 | A | 7/1997 | Shikama | |
| 5,673,084 | A | 9/1997 | Lim et al. | |
| 6,101,046 | A | 8/2000 | De Winter | |
| 6,469,839 | B2 * | 10/2002 | Agata | 359/694 |

* cited by examiner

*Primary Examiner*—David Spector
*Assistant Examiner*—Joseph Martinez
(74) *Attorney, Agent, or Firm*—Patterson, Thuente, Skaar & Christensen, P.A.

(57) ABSTRACT

The invention relates to an arrangement of optical elements in projection systems, preferably in projection modules having a changeable focal width such as for the imaging of tilt mirror matrices or for the imaging of reflective, i.e. transmissive, LCDs, whereby the optical elements (2, 3) fixed in place in mechanical holders (6, 7) are arranged so that they can be positioned on a common optical axis (5) relative to one another.

According to the invention, for the purpose of accommodating the mounted optical elements (2, 3, 4), a common carrier element (1) is provided.

With a minimized number of optical and mechanical elements, both the construction lengths and the diameters of the overall arrangement are reduced so that inexpensive production is possible.

18 Claims, 1 Drawing Sheet

ARRANGEMENT OF OPTICAL ELEMENTS IN PROJECTION SYSTEMS

RELATED APPLICATIONS

This Application claims priority to German Patent Application No. 103 16 721.8, filed Apr. 10, 2003.

FIELD OF THE INVENTION

The invention relates to an arrangement of optical elements in projection systems, preferably in projection modules having a changeable focal width such as for the imaging of tilt mirror matrices or for the imaging of reflective, i.e. transmissive, LCDs, whereby the optical elements fixed in place in mechanical holders are arranged so that they can be positioned on a common optical axis relative to one another.

BACKGROUND

Known arrangements having a changeable focal width that are used, for example, for the imaging of tilt mirror matrices differ essentially in the number of optical elements (lenses), their arrangement in the device as a whole, as well as the technical design data, in combination with the conditions that apply for the optical system. Such arrangements are described, for example, in U.S. Pat. No. 5,644,435 and DE 69328891.

Since it is desirable for the most frequent applications to change the size and the location of the image in order to thereby adapt the projection to the most varied spatial conditions, projection zoom systems are primarily used.

Such arrangements often use many lens elements and are therefore highly cost-intensive. Furthermore, different zoom movements have to be implemented. This has the result that the arrangements have a very complex structure, and therefore no small construction sizes, in terms of diameter and construction length, can be implemented.

SUMMARY OF THE INVENTION

Proceeding from these disadvantages, the invention is based on the task of further developing an arrangement of optical elements in projection systems so that both the construction lengths and the diameters of the overall arrangement can be reduced, with a minimized number of optical and mechanical elements, and thereby inexpensive production is possible.

This task is accomplished by means of an arrangement of the type described initially, according to the invention, in that for the purpose of accommodating the mounted optical elements only one common carrier element is provided that can be an integral part of the overall device (chassis) or that is configured as a releasable unit.

In this main carrier element, it is practical if only one focusing element and one zoom element are provided, i.e. only one element is used for focusing and only one element is used for changing the focal width, whereby it is practical if the system of the optical elements (lenses) is configured in such a manner that, during a zoom movement, the focusing state does not change or changes only slightly. Furthermore, additional optical elements such as a field lens can be integrated rigidly into the main carrier element.

Depending on the application, it can prove to be practical to integrate a light source 12 into the main carrier element, as well.

It is practical if pairs of threads are provided between the holders of the adjustment elements and the main carrier element for the purpose of the axial displacement of the focusing element and the zoom element, whereby rotational movements of the adjustment elements are converted into translational movements.

A possible embodiment consists of controlling the rotational movements of the focusing element and/or of the zoom element by way of guide cams.

The use of simple straight-line guides is also possible, whereby the translational displacement movements are directly initiated by means of introducing force onto the focusing element or the zoom element, respectively.

Depending on the application, the guides can be of the same type, i.e. configured either as pairs of threads between the main carrier element and the adjustment elements or as straight-line guides. But combinations are also possible, whereby either the focusing element is accommodated in the main carrier element by way of a pair of threads and the zoom element is accommodated by way of a straight-line guide, or vice-versa.

If the main carrier element is not a direct component of the overall piece of equipment, another advantageous embodiment of the arrangement consists of rigidly connecting the focusing element with the main carrier element and performing the axial displacement movement to change the focal width by way of a movement of the main carrier element itself. Analogously, this arrangement, i.e. this adjustment mechanism, would also be possible for the zoom element, whereby the adjustment element not connected with the main carrier element, in each instance, does not follow the change in movement of the main carrier element.

In the production of the adjustment movements of the focusing element or zoom element, it can prove to be advantageous if the individual adjustment mechanisms are separated from one another in order, for example, to be able to make a separate correction of the focus in case of a change in the location of the zoom element and a related lack of focus of the image.

Furthermore, it is practical to arrange not only the focusing element and the zoom element but also the image-producing device into the main carrier element, as well.

The use of only one focusing element and only one zoom element with the simultaneous arrangement of the image-producing device in the common main carrier element makes it possible to design compact projection systems, i.e. optical modules having extremely small dimensions with regard to construction length and diameter, in a cost-effective manner. In the case of a zoom factor of >1.1, arrangements with constructions lengths of <70 mm as well as front lens diameters of <27 mm can be designed.

All of the optical elements can be arranged in a sealed unit (module) so that a lens system that can be separated from the module is no longer required, as is known from the solutions according to the state of the art.

Figure 1:
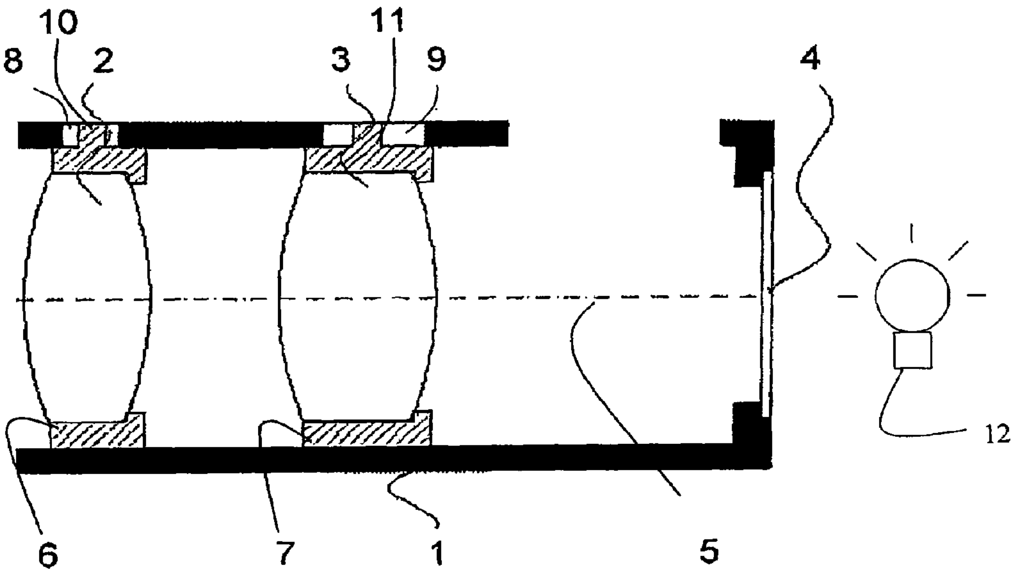
FIG. 1 is a schematic description of an embodiment of the invention.

The arrangement according to the invention will be explained in greater detail below, using an example embodiment.

DETAILED DESCRIPTION OF THE INVENTION

The related Figure shows a main carrier element 1 in the form of a hollow cylinder in which a lens system, consisting of a focusing element 2 and a zoom element 3, is arranged in alignment with the optical axis 5. At the same time, an image-producing device 4 is located directly in the main carrier element 1.

For the purpose of the axial displacement of the lens system, the focusing element 2 is guided in the main carrier element 1 by way of the holder 6, and the zoom element 3 is guided by way of the holder 7. For this purpose, the outside walls of the holders 6 and 7 are in direct contact with the inside walls of the main carrier element 1. Furthermore, guides 8 and 9 are made in the walls of the main carrier element 1, into which shaped elements 10 and 11 of the holders 6 and 7 engage.

The figure shows the arrangement of the lens system in the main carrier element 1 only schematically. In this regard, the connection points between the holders 6 and 7 and the main carrier element 1 can be configured either as pairs of threads or as straight-line guides. In the case of pairs of threads, rotation movements of the holders 6 and 7 would be produced by way of the shaped elements 10 and 11, which movements would then be converted to axial displacement movements because of the pairs of threads. For this purpose, the guides 8 and 9 would have to be configured accordingly as a function of the rotation ranges to be implemented.

Another possibility could be that translational displacement movements are initiated directly by way of the shaped elements 10 and 11, whereby the connections between the focusing element 2 or the zoom element 3 and the main carrier element 1 are configured as straight-line guides, and the guides 8 and 9 serve exclusively to guide the shaped elements 10 and 11 in the required adjustment range. In this context, the guides 8 and 9 can be configured either as straight slits or in curve shape.

Depending on the application, it can also prove to be advantageous to do without the shaped elements 10 and 11 on the holders and to provide pins that are introduced into the holders 6 and 7 radially instead. This would particularly simplify the effort in assembling the arrangement.

The figure schematically shows only one specific variant of the arrangement according to the invention, whereby other optical modules that are possibly also arranged in the main carrier element 1 are not shown. The sequence of the arrangement of the optical elements, such as the focusing element, the zoom element, the lenses and lens groups, depends on the application, in each instance.

REFERENCE SYMBOL LIST

1 Main carrier element
2 Focusing element
3 Zoom element
4 Image-producing device
5 Optical axis
6, 7 Holder
8, 9 Guide
10, 11 Shaped element

What is claimed is:

1. A projections system, the projection system having a chassis, the projection system comprising:

a carrier;

an image generating element;

a first optical element supported by a first mechanical holder;

a second optical element supported by a second mechanical holder;

the image generating element, the first optical element and the second optical element being located on a common optical axis;

the first mechanical holder being movably supported by the carrier such that at least the first mechanical holder is movable in a direction parallel to the common optical axis; and such that the second mechanical holder is fixedly supported by the carrier and the carrier is moved along with the fixedly supported second mechanical holder while the movable first mechanical holder is held stationary relative to the chassis.

2. The projector as claimed in claim 1, in which the carrier is integrally formed in the chassis.

3. The projector as claimed in claim 1, further comprising a light source supported by the carrier.

4. The projector as claimed in claim 1, in which the carrier is separable from the chassis.

5. The projector as claimed in claim 1, in which the first optical element comprises a focusing element and the second optical element comprises a zoom element.

6. The projector as claimed in claim 1, in which at least one of the first mechanical holder or the second mechanical holder is supported by threaded members that convert rotational movement into axial movement.

7. The projector as claimed in claim 6, further comprising guide cams controlling the movement of the threaded members thus controlling the axial movement of the at least one of the first mechanical holder or the second mechanical holder.

8. The projector as claimed in claim 1, in which the first mechanical holder and the second mechanical holder are movable independently of one another.

9. The projector as claimed in claim 1, further comprising line guides between the carrier and at least one of the first mechanical holder or the second mechanical holder to allow axial movement.

10. The projector as claimed in claim 1, in which the image generating element is fixedly supported by the carrier.

11. A method of supporting elements in a projection system, the projection system comprising a chassis, the method comprising the steps of:

supporting a carrier on the chassis mounting an image generating element in the projector;

mounting a first optical element supported by a first mechanical holder in the carrier;

mounting a second optical element supported by a second mechanical holder in the carrier;

aligning the image generating element, the first optical element and the second optical element such that they are located on a common optical axis;

mounting at least one of the first mechanical holder and the second mechanical holder such that the first mechanical holder and the second mechanical holder movably supported by the carrier such that at least the first mechanical holder or the second mechanical holder is movable in a direction parallel to the common optical axis; and fixedly supporting one of the first mechanical holder and the second mechanical holder in the carrier;

holding the other of the first mechanical holder and the second mechanical holder stationary relative to the chassis and moving the carrier along with the fixedly supported mechanical holder relative to the chassis.

12. The method as claimed in claim 11, further comprising the step of forming the carrier integrally in the chassis.

13. The method as claimed in claim 11, further comprising the step of mounting a light source on the carrier.

14. The method as claimed in claim 11, further comprising the step of constructing the carrier to be separable from the chassis.

15. The method as claimed in claim 11, further comprising the step of mounting at least one of the first mechanical holder or the second mechanical holder in a threaded member that converts rotational movement into axial movement.

16. The method as claimed in claim 15, further comprising the step of installing guide cams to control the movement of the threaded member.

17. The method as claimed in claim 11, further comprising the step of installing linear guides in the carrier to allow axial movement of at least one of the first mechanical holder or the second mechanical holder.

18. The method as claimed in claim 11, further comprising the step of fixedly mounting the image generating element to the carrier.

* * * * *